United States Patent
Inbar et al.

(10) Patent No.: US 6,885,660 B2
(45) Date of Patent: Apr. 26, 2005

(54) END TO END NETWORK COMMUNICATION

(75) Inventors: Shiomo Inbar, Tel Aviv (IL); Avi Oron, Doar Na Misgav (IL)

(73) Assignee: Lead IP Systems Ltd., D.N. Misgav (IL)

(*) Notice: Subject to any disclaimer, the term of this patent is extended or adjusted under 35 U.S.C. 154(b) by 100 days.

(21) Appl. No.: 10/075,256

(22) Filed: Feb. 15, 2002

(65) Prior Publication Data

US 2002/0150110 A1 Oct. 17, 2002

Related U.S. Application Data

(63) Continuation-in-part of application No. PCT/IL01/00310, filed on Apr. 4, 2001.

(51) Int. Cl.[7] .............................................. H04L 12/66
(52) U.S. Cl. ........................ 370/352; 709/245; 709/229
(58) Field of Search ................................ 370/352, 353, 370/354, 355, 356, 389, 392, 395.52, 395.53, 400, 401, 469; 709/227, 228, 229, 203, 236, 245

(56) References Cited

U.S. PATENT DOCUMENTS

| | | | | |
|---|---|---|---|---|
| 5,608,786 A | * | 3/1997 | Gordon | 370/352 |
| 5,742,905 A | * | 4/1998 | Pepe et al. | 455/461 |
| 5,956,485 A | * | 9/1999 | Perlman | 709/204 |
| 5,960,177 A | * | 9/1999 | Tanno | 709/229 |
| 6,044,403 A | * | 3/2000 | Gerszberg et al. | 709/225 |
| 6,108,704 A | * | 8/2000 | Hutton et al. | 709/227 |
| 6,292,838 B1 | * | 9/2001 | Nelson | 709/236 |
| 6,324,585 B1 | * | 11/2001 | Zhang et al. | 709/245 |
| 6,434,619 B1 | * | 8/2002 | Lim et al. | 709/229 |
| 6,449,344 B1 | * | 9/2002 | Goldfinger et al. | 379/88.17 |
| 2001/0025275 A1 | * | 9/2001 | Tanaka et al. | 705/412 |

* cited by examiner

Primary Examiner—Brian Nguyen
(74) Attorney, Agent, or Firm—G.E. Ehrlich (1995) Ltd.

(57) ABSTRACT

A system manageable for peer to peer communication between subscribers, the system comprising: a) a subscriber end digital communication management device for managing digital communications with remote subscribers, the device comprising: an internal interface for interfacing with at least one subscriber electronic device, an IP address manager for formulating a request for an IP address corresponding to a user defined remote subscriber, submitting said request and recording a response thereto, and a packet addresser, associated with said IP address manager, for addressing data packets to said user defined remote subscriber using an IP address taken from said recorded response, and b) an Internet connection management device for receiving and processing said request, said device comprising: a database for storing user identification names of said subscribers in a first field and respective assigned user IP addresses in a second field, a database manager for determining assigned user IP addresses of ones of said subscribers currently connected and dynamically updating said second field therewith, and a request manager for receiving external requests specifying at least one user identification request, interrogating said database and responding with respective IP addresses, thereby to provide peer to peer connections between said subscribers and end to end transaction data for billing.

11 Claims, 5 Drawing Sheets

END TO END NETWORK COMMUNICATION

RELATIONSHIP TO EXISTING APPLICATIONS

The present application is a continuation in part of PCT IL01/00310 Apr. 4, 2001.

FIELD OF THE INVENTION

The present invention relates to manageable end to end or peer to peer communication via a network and more particularly but not exclusively to end to end manageable communication using the Internet infrastructure for unspecified kinds of communication.

BACKGROUND OF THE INVENTION

Generally speaking, end users of the Internet connect, via any available infrastructure, to an ISP or like Internet gateway. The Internet, although being a mesh transport network, is used for most application purposes as a star-configuration with large amounts of processing taking place at central locations. Generally, the Internet is based on the client-server connection model, as opposed to peer to peer.

The client server configuration has a number of disadvantages. First of all, an Internet service provider has to make available a capacity that can cope with peak time use at the servers centers. Such a capacity requires a large initial investment and regular and large scale growth both as the number of his customers increases and as the average amount of use per customer increases. Furthermore, each increase in capacity only increases the demand per customer, since an improvement in performance encourages users to make use of capacity hungry features, such as multimedia and virtual reality, which may not have been realistic before the capacity increase.

In addition, the Internet service provider is required to set up dedicated servers and server farms for different kinds of services, for example e-mail servers, web-servers, perhaps even more specialized servers such as a juke box server, and this only adds to the investment required. Furthermore, all of these services have to be integrated with each other, with a central control and with billing servers and other functions. Integration involves both time and cost, and is not restricted to set up of the initial system. Rather integration has to be carried out whenever new additions are made to the service provider's overall system or whenever upgrading of existing features is provided anywhere on the system.

Considering standard client server connections over the Internet in greater detail, the Internet generally speaking routes digital data packets over nodes to an intended destination. Each node, usually a router, has a unique IP address which is to be used by other routers to locate it. An Internet user is generally connected to the network via an Internet-Service-Provider (ISP) or via an Internet Point-Of-Presence (POP). The ISP has a domain, within which the user is allocated an individual identity, and the ISP enables the user to communicate over the Internet by allocating him a temporary IP address. The user may use known static IP addresses, or domain names which relate to such IP address, to connect to servers and web sites, but in order to connect to remote users, he has to know their temporary assigned IP address in advance—which in most case is practically impossible.

Recent developments in Internet use include messaging systems such as ICQ, Yahoo messenger and Microsoft's .Net system. Broadly speaking, in these systems, a user is assigned a username. The user is required to log into a central server and submits his current IP address, which is placed in a table along with his user name. Other users are able to communicate with him by submitting his user name and obtaining his IP address from the table. An individual message is then sent directly to the respective IP address. The messaging systems can support text, voice and video communications.

The messaging systems have the advantage that a high powered center is not required. The center is required to deal with nothing more than a single IP lookup request for each respective communication. However, it has the disadvantage that it requires a general purpose computer as the terminal device & the usage of the messaging system's application proprietary address translation protocol. The terminal device is required to make IP lookup requests, interpret the results and use the results to address data packets that it is able to generate. Furthermore, due to the absence of system billing mediation, such messaging systems do not have the ability to charge users for the service. Furthermore, users are identified by their "nick names" which makes it almost impossible to access a person unless the user is familiar with the addressee's "nick name", unlike a known phone-number for example,

SUMMARY OF THE INVENTION

Preferred embodiments of the present invention create smart end points, that is to say intelligent communication terminals that can support peer to peer communication and do not require intermediate servers. In particular the smart end points are able to support communication management, security management and all premise required services. The smart endpoints may act both as clients and as servers, thus combining the benefits of client/server & centerless topologies.

According to a first aspect of the present invention there is thus provided a subscriber end digital communication management unit for managing digital and analog communications with remote subscribers, the device comprising:

an internal interface for interfacing with at least one subscriber electronic device, an IP address manager for formulating a request for an IP address corresponding to a user defined remote subscriber, submitting said request to an external location and recording a response thereto, and a packet addresser, associated with said IP address manager, for addressing data packets to said user defined remote subscriber using an IP address taken from said recorded response, thereby to set up a peer to peer connection with said user defined remote subscriber.

The unit is preferably operable to store a defined access name or number for unique identification.

Preferably, said internal interface is a LAN interface.

Preferably, said subscriber electronic devices are any one of a group comprising: a magnetic card reader, a smart card reader, a security sensor, a meter, an electronic utility, a video camera, a television, a Wireless device including a Bluetooth or other wireless local loop device, a telephone, a fax machine, a cellular telephone, a personal digital assistant, a portable computer and a desktop computer.

Preferably, said at least one communication network is any one of the PSTN, the Internet, cable network, satellite network, a cellular network, a radio wireless network, and an optical fiber network.

Preferably, said at least one communication network is the Internet and any one of the PSTN, a cellular network, a radio network, and an optical fiber network.

Preferably, said packet addresser comprises TCP/IP functionality.

The unit preferably further comprises a backup power supply.

The unit preferably further comprises a secure communication unit comprising cryptographic functionality.

Preferably, said cryptographic functionality comprises at least one of encryption of communications, decryption of communications and verification of communications.

The unit is either located within software on a PC platform, or may be embedded, either as software or hardware, within a dedicated or general purpose device.

The unit preferably comprises an accumulated transaction log for billing data, said transaction log being transferable to the subscriber or to a billing center.

Preferably, said request is further operable to determine whether said user defined remote subscriber has a similar device.

The unit preferably further comprises master functionality to perform in a master server mode to other units.

The unit preferably further comprises slave functionality to perform in a slave mode to other units.

According to a second aspect of the present invention there is provided an internet connection management unit for supporting end to end Internet connections between subscribers, said unit comprising:

a database for storing user identification names of said subscribers in a first field and respective assigned user IP addresses in a second field, a database manager for determining assigned user IP addresses of ones of said subscribers currently connected and dynamically updating said second field therewith, and a request manager for receiving external requests specifying at least one user identification request, interrogating said database and responding with respective IP addresses.

The unit preferably comprises a security layer.

Preferably, said security layer comprises a firewall.

Preferably, said security layer comprises connection authentication functionality.

Preferably, said security layer comprises encryption functionality.

The unit preferably comprises connection monitoring functionality for monitoring said subscriber end to end connection.

Preferably, said functionality for monitoring is associated with functionality for providing billing records.

The unit preferably further comprises pushing functionality for sending data to a group or to all of said subscribers.

According to a third aspect of the present invention there is provided a system for peer to peer communication between subscribers, the system comprising:

a) a subscriber end digital communication management device for managing digital communications with remote subscribers, the device comprising:

an internal interface for interfacing with at least one subscriber electronic device, an IP address manager for formulating a request for an IP address corresponding to a user defined remote subscriber, submitting said request and recording a response thereto, and a packet addresser, associated with said IP address manager, for addressing data packets to said user defined remote subscriber using an IP address taken from said recorded response, and b) an Internet connection management device for receiving and processing said request, said device comprising:

a database for storing user identification names of said subscribers in a first field and respective assigned user IP addresses in a second field, a database manager for determining assigned user IP addresses of ones of said subscribers currently connected and dynamically updating said second field therewith, and a request manager for receiving external requests specifying at least one user identification request, interrogating said database and responding with respective IP addresses, thereby to provide peer to peer connections between said subscribers.

The system preferably further comprises a billing mechanism for accumulating a transaction log at the subscriber end and retrieving data of said log to the master server.

According to a fourth aspect of the present invention there is provided a method of providing end to end communication over a TCP/IP based network, the method comprising:

selecting a remote subscriber to establish said communication with, obtaining user address data for said remote subscriber, sending to a remote database said user name to obtain an IP address corresponding to said user address data of said remote subscriber, and if said IP address is obtained then establishing an end-to-end connection with said remote subscriber using said obtained IP address to address data packets of said communication.

The method preferably further comprises accumulating end to end transaction data for billing.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DESCRIPTION OF THE PREFERRED EMBODIMENTS

Figure 1:
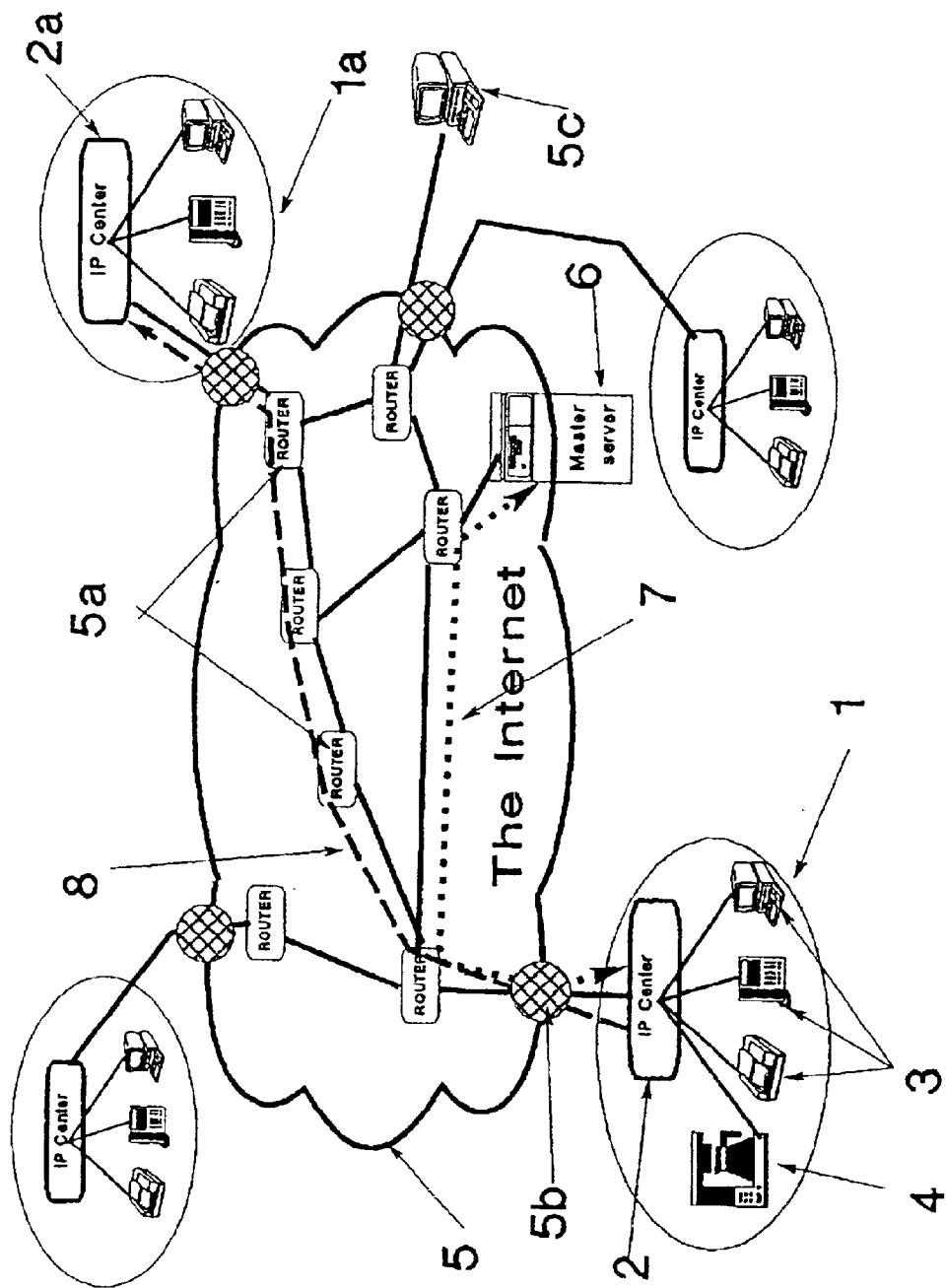
FIG. 1 is a simplified diagram showing a communication system according to a preferred embodiment of the present invention connected via the Internet.

The present embodiments provide a peer to peer configuration for communication using any kind of media. The configuration uses querying to obtain an IP address from a central server, and then allows for a direct peer to peer connection to be formed using the IP address obtained. The IP address is preferably cached at the requesting party, preferably with a time to live validity indicator, so that the total number of queries is reduced and so that the connection is not halted by temporary failure of the central server or the connection thereto. The direct connection preferably supports any kind of communication. A terminal unit is able to support querying and caching, and also carries out usage monitoring for billing purposes, producing a usage file which is submitted, preferably at non-peak usage times, to a billing server.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Reference is now made to FIG. 1, which is a simplified block diagram showing a plurality of subscriber sites connected via a communication network, operative in accordance with an embodiment of the present invention. A plurality of subscribers 1,1a each have a local communication co-ordination unit, hereinafter an IPCenter unit 2, 2a. Preferably, communication devices 3, and even other electronic appliances 4 such as a remotely controllable coffee maker or refrigerator, are connected to the subscriber's IPCenter 2, 2a. Each IPCenter 2, 2a is connected, either directly or indirectly, to the Internet via any available infrastructure. The Internet 5 itself comprises a number of data lines connected to one another by nodes, typically routers 5a, and the connection 5b to the Internet may be through an ISP or POP connection, as described above. A non-subscribed Internet user 5c is typically connected to the Internet by an ISP or a POP type connection. As an alternative, the connection 5b may be a wireless IP arrangement so that the IPCenter 2 is in fact connected wirelessly. The embodiment thus uses the cellular network as an Internet broadband connection, thereby creating a static cellular network. Typically, the IPCenter unit 2, 2a, is connected to the Internet through available infrastructure, which may include any of broadband connections, the PSTN and an ISP server, and each IPCenter is preferably provided with a name. The name may simply be a user name, or may be in the name.sub-domain.domain format of Internet compatible addressing. The IPCenter unit 2,2a provides further sub-domain-names for local network devices and electronic appliances.

In order to manage Internet compatible addressing for the IPCenters, there is preferably provided a Master-Server 6. The master server is preferably assigned a domain name and the usernames assigned to the users may be set up as sub-domains of the master server. The Master-Server 6 preferably has a table of active users together with current IP addresses. The table may also include other information such as traffic situation etc.

A transaction between two subscribers, such as a telephone call, the sending of an Email or a request to download a webpage or file etc. may be carried out directly between the two respective IPCenter units. The originating IPCenter (e.g. 2) preferably first issues a query to the master server asking for the IP address corresponding to a required name. The query triggers the master server to look up the IP address in the table. The IP address is returned to the IP center which then both caches the IP address, together with any time to live data, and also sets up a peer to peer connection using the IP address provided.

Figure 2A:
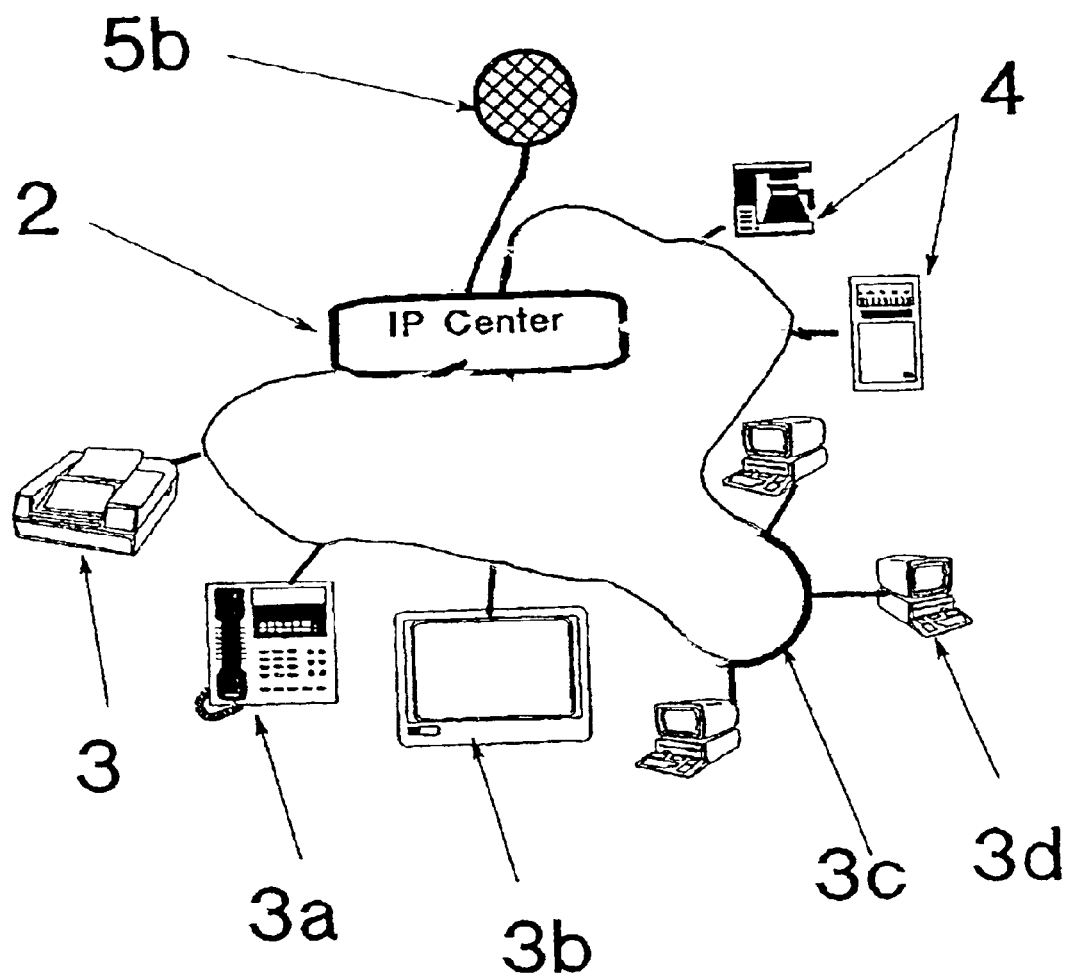
FIG. 2A is a simplified block diagram showing a way of connecting communication equipment at subscriber premises according to an embodiment of the present invention.

Reference is now made to FIG. 2A, which is a simplified block diagram showing a subscriber's end-user premises, arranged to be used in accordance with a preferred embodiment of the present invention. Parts that appear in earlier figures are given the same reference numerals and are not discussed in detail again except as needed for an understanding of the present embodiment. In the subscriber's end-user premises an IPCenter unit 2, as described above, is installed. The user typically has a plurality of communication devices, connected, via a LAN 3c, to the IPCenter unit, including for example a FAX machine 3, telephone 3a, cable TV 3b, and a number of PCs 3d. Electronic appliances 4, such as a coffee machine, a refrigerator, an air conditioner, and a washing machine, may also be connected to the IPCenter for such purposes as monitoring, metering and remote control.

The IPCenter unit is preferably connected to the Internet 5b either by an ISP, in which case it may use an ISP router or by a POP connection directly to a router.

Figure 2B:
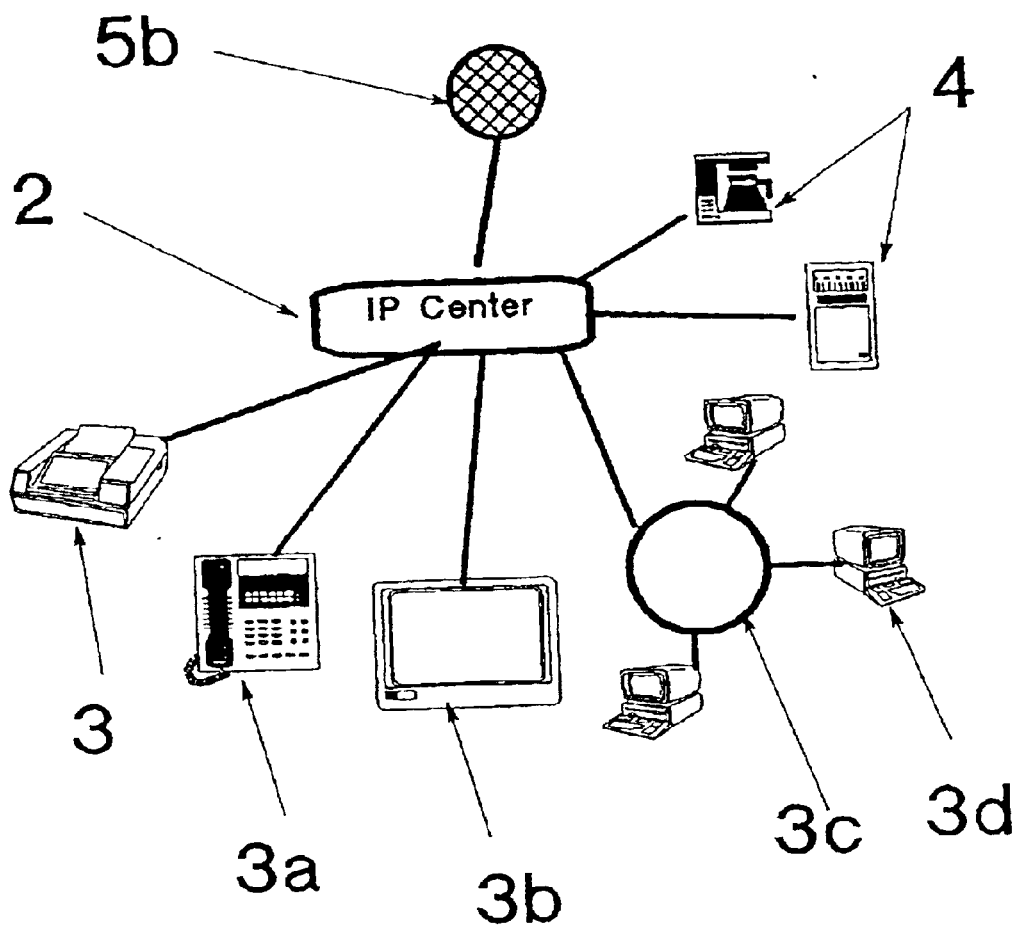
FIG. 2B is a simplified block diagram showing another way of connecting communication equipment at subscriber premises according to a block diagram of the present invention.

Reference is now made to FIG. 2B, which is the same as FIG. 2A except that the LAN 3c links up only the computers, the rest of the devices being connected directly to the IPCenter. The Arrangement of FIG. 2B operates substantially in the same way as that of FIG. 2A.

Figure 3:
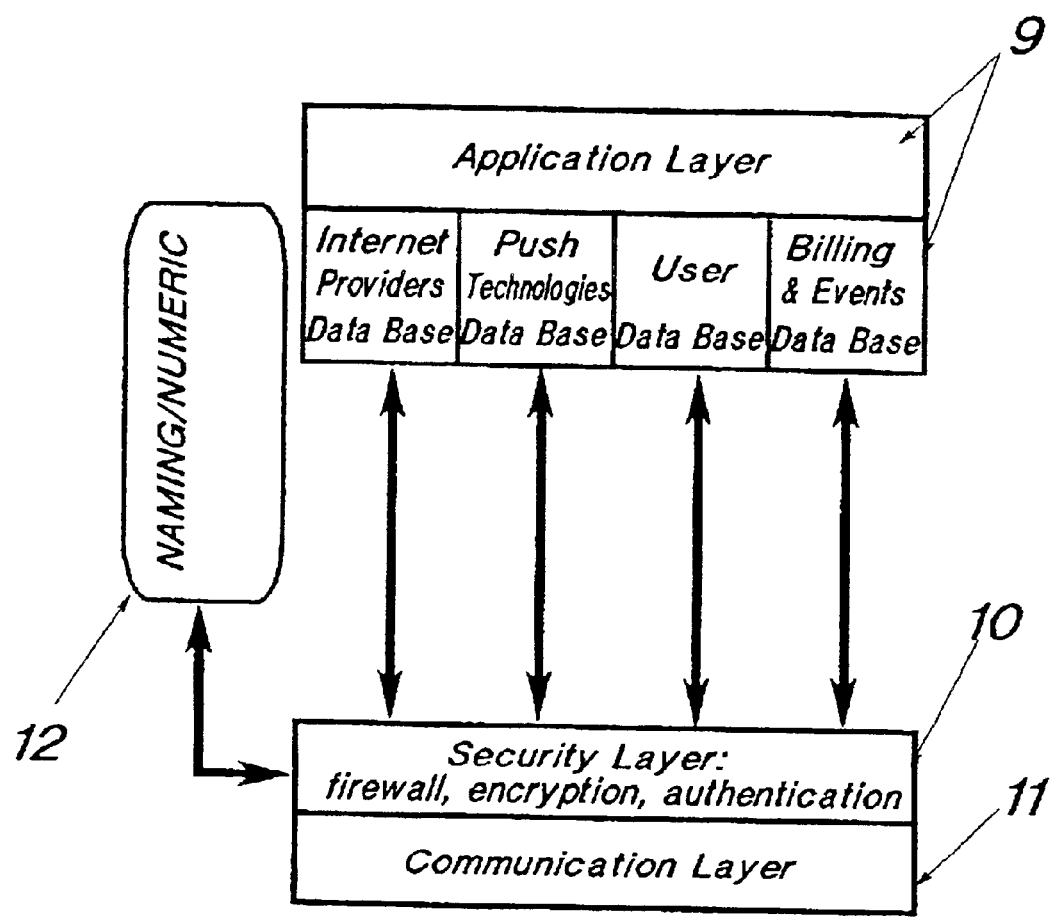
FIG. 3 is a simplified layer diagram showing layers involved in the programming of the master server of FIG. 1, and operative in accordance with a preferred embodiment of the present invention.

Reference is now made to FIG. 3, which is a simplified layer diagram showing the organization of the master server 6 of FIG. 1, operative in accordance with a preferred embodiment of the present invention. The Master-Server comprises four principle layers. The first layer is an application layer with data-bases 9. The layer includes a standard Internet providers' database, a push technologies database for pushing information to the various subscribers, a user database which records subscriber IP addresses and domain names and other information of the individual subscribers, and a billing and events database. The push database can also be used to send software upgrades to users.

The second layer is a security layer 10, typically comprising a firewall, and encryption and authentication means for the communication and application layer. The third layer is a communication layer 11, which manages communication between itself and the various IPCenters for the purpose of retrieving billing information, address to IP translation etc., and the fourth layer is an addressing layer 12, which inter alia carries out naming/numeric address translation of requested addresses.

The master server, via the above layers, thus makes the respective IP addresses available to requesting devices and gathers billing and like information.

Figure 4:
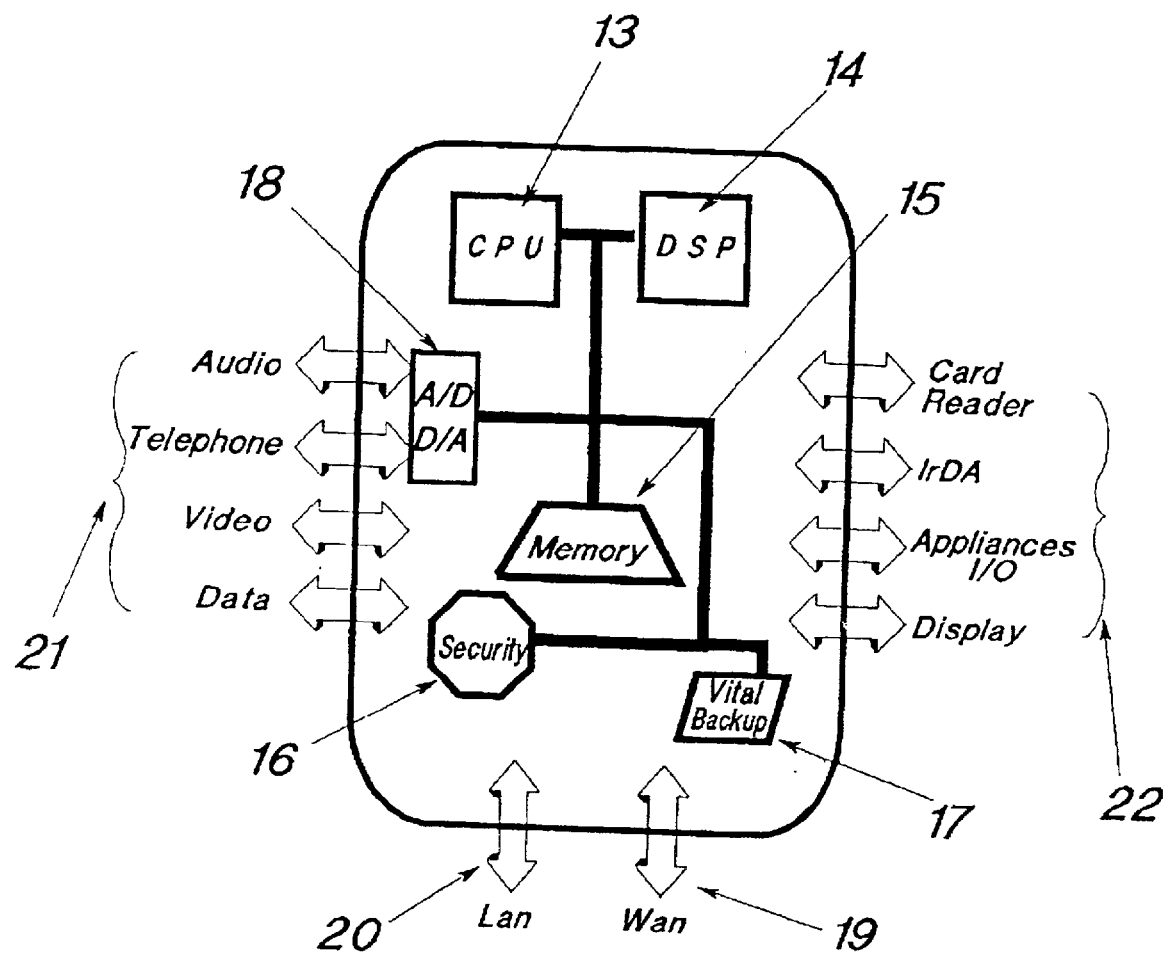
FIG. 4 is a simplified block diagram of the IPCenter of FIG. 1, operative in accordance with a preferred embodiment of the present invention.

FIG. 4 is a simplified block diagram of an IPCenter unit. The IPCenter at its very simplest need only be a switching unit for handling data packets and which is able to formulate requests for IP addresses, receive the responses and then use the IP addresses received in the responses to address data packets. The preferred embodiment as shown in FIG. 4 goes beyond the minimal device in that it comprises a microprocessor CPU 13, augmented by a digital signal processor (DSP) 14. The IPCenter further comprises software to perform and manage the various IPCenter activities, as well as memory 15, a security system 16, backup unit 17, and a converter unit 18, which is able to carry out D/A and A/D conversions. The IPCenter preferably has a plurality of interfaces and connections. A WAN interface 19 may be used to connect to the Internet using cable, satellite, cellular, wireless, power lines or dial up modem, and a LAN interface 20 may connect the unit to a local area network such as LAN 3c of FIG. 2. The IPCenter unit preferably has a number of interfaces 21 for individual kinds of communication devices e.g. audio, telephone, video and data and may additionally comprise a number of physical interfaces 22 for card readers, IrDA, appliances I/O, display and others physical devices.

The IPCenter of the above embodiments is thus able to use IP addresses received from the central unit to support End-to-End or peer to peer communication. Subscribers are thereby enabled to make direct connections to each other, thus avoiding the need to make use of Intermediate servers. A user may for example send Emails or text messages directly without mediation of servers and likewise may carry out a phone-call, and hold fax, data and video sessions. The user is also able to send and receive sensing and control signals in the same way or carry out any kind of less conventional communication. An arrangement at one end in which standard houshold devices are connected via a wireless connection to the IPCenter allows remote control of these devices so that for example a user can connect remotely to his IPCenter and check on the status,read meters ,or carry out control, of his fridge or turn on his coffee machine or his air conditioning or alarm and security systems.

The present embodiments allow personal/SOHO services such as web hosting, E-commerce, video and other Internet services to be supported at the end-user's premises, and also provides remote control of electronic appliances, including metering and sensing without needing any dedicated support.

The above embodiments have been described with reference to a domestic environment. It will however be appreciated that the same applies to the industrial and commercial environment, the difference being only the size and nature of the internally supported LAN.

A particular advantage of the present embodiments is that each end-subscriber user can be mobile and may connect up from anywhere on the globe, using the Internet network, since there is no need to connect to any given ISP or POP provider. Rather the IPCenter needs only to connect successfully to the Internet, receive a temporary IP address and to identify itself to the master server. The temporary address at the master server allows others to communicate with it and it is able to receive, from the master server, the IP addresses of other users with which it may wish to communicate.

The present embodiments allow any communication device, connected to an appropriate network to be contacted, as well as allowing contact between different subscribers to the IPCenter system.

An IPCenter is preferably located at the subscriber's premises, as described above, to interface between the external network and the subscriber's internal network and devices. The connection to the external network may be via any independent infrastructure and may comprise a dialup or dial-in link over the PSTN to the closest entry point of the Internet network (POP). Connections may be via broad band or narrow band connection or fiber.

A connection is established with a master-server on the Internet. Preferably the master server has a registered Internet Universal-Resource-Location (URL) and all of the IPCenter units are sub zones within the master-server's domain, as described above.

As discussed above, the IPCenter registers its assigned IP address when it connects to the master server, which is to say that the subscriber receives a global-unique name and/or number, using a global naming-numeric-scheme such as that used for providing names on the Internet. He uses the name to identify himself, as described above, permanently, whereas the IP address may only be assigned temporarily.

Subscribers' data in the Master-Server is preferably arranged, in a table as described above, to allow it to find an IP address according to a subscriber name, using the global naming-scheme, each other subscriber having a unique Domain-Name to make such identification possible.

When a device in the subscriber's premises is activated, the IPCenter identifies the device. The user then preferably identifies an addressee, by pointing to an entry in an address book etc. and the IPCenter is then able to formulate a request for an IP address.

The IPCenter then preferably connects to the Master-Server to find out if the addressee is a subscriber or not. If the addressee is a subscriber and is currently on line, then the Master-Server is able to refer to its look up table and convert the name or the number into an IP address.

Alternatively, If the IPCenter recognizes that a connection has already been made in the past with the required addressee and the addressee has a fixed IP address, it may take the destination IP-address from a local memory history table where the address has been cached.

Once an IP address has been obtained, the originating IPCenter may connect directly, using the Internet routers and the given IP address, to the addressee IPCenter, which is to say it arranges the communication into standard data packets giving the IP address obtained as the destination address.

The addressee IPCenter receives the communication, acts as a local device and establishes the communication through the local communication devices connected thereto.

If the addressee is not a system subscriber, the IPCenter establishes the communication using any conventional means such as a standard PSTN connection,or an IP gateway for connecting conventionally via the Internet.

The IPCenter preferably includes A/D and D/A conversion ability for converting signals between analog and digital when and where needed.

The IPCenter preferably records usage and billing information, and, as described above, reports billing information to the Master-Server, or to a separate billing unit associated with the master server. In addition to usage and billing information, the IPCenter may report Quality-of-Service (QoS) information, and in some cases connectivity monitoring information, status information of connected devices and other information as may be defined. Billing files are preferably encoded and the master server is preferably able to query IPCenters that have not reported billing information for more than a predetermined interval.

The IPCenter is able to connect in the usual way to available Internet services, as an alternative to using the master server.

The Master-Server is preferably a node of the Internet, but is at the very least connected to the Internet. Preferably it holds updated information of all of the system subscribers, for example including Domain-Name, IP address, traffic, status, and the like. It is likely that, at least domestic subscribers use dynamic IP addressing, and thus the master server may be required to keep track of dynamically changing IP addresses.

The IPCenter, which is installed in each subscriber premises is able to connect, via Internet infrastructure, to the master server. It is further connected to the communication devices of the end-user premises.

As discussed above, the IPCenter preferably comprises a microprocessor, including or being connected to a digital-signal-processor (DSP). The microprocessor preferably has software to perform and manage IPCenter activities, in particular managing IP address querying, packet addressing and logging for billing purposes, as described above.

The IPCenter preferably includes a first input/output (I/O) unit, to connect to the Internet.

The IPCenter preferably includes a second input/output (I/O) unit, to connect to the communication devices of the end-user premises.

The IPCenter preferably further comprises A/D and D/A conversion ability as mentioned above and authentication, security and encryption circuitry to ensure privacy and security of communications. Preferably the level of security is customizable. The authentication, security and encryption circuitry may comprise a voice security system and/or a data security system and/or a video security system, to enable secure use of credit card readers, smart card readers, and to ensure secure transmission of information via the network from one end to other end.

A preferred embodiment of the present invention comprises environment, RFI (Radio Frequency Interference) and electric protection circuitry.

A farther preferred embodiment of the IPCenter comprises a backup power supply so that communication is not lost in the event of a power cut. In general, telephone links are not lost during a power cut since the PSTN is separately powered. The IPCenter may run all of the subscriber's communications, and therefore it should not provide disadvantages over an unsophisticated telephone link, which is to say it too should be able to allow at least normal telephone links when the power is cut.

As discussed above, in order to communicate using available communication networks and to connect to available local communication devices the IPCenter preferably comprises suitable input/output (I/O) connectors including Audio, Video, Fiber-optics, Cellular, RF, LAN, and WAN connectors.

The IPCenter preferably includes suitable physical device interfaces such as Infra-Red and Wireless, Smartcard readers, Magnetic card readers and Laser readers.

The IPCenter preferably has a user display and/or indicators.

The IPCenter preferably has means for receiving data for loading software and carrying out operational functions. The means may for example be a disk drive or the infra-red reader referred to above.

The IPCenter may include a data connectivity unit to operate for example via USB, serial port or IrDA. The connectivity unit may thus allow access to a PC, printer, scanner, palm pilot or digital camera or video camera. The IPCenter may be provided as a mobile version, intended for traveling and to allow access to the Internet from wherever the traveler may be. Such a mobile version may also include a GPS capability to be used for system registration and applications.

The IPCenter may be provided as software on a PC platform with or without additional hardware or as a part of other communication, security, entertainment or other devices.

The system may include the ability to push information from various sources into one or more of the subscriber IPCenter units. Such may be done as a general multi-cast or selection may be carried out of individual users or groups of users. Generally, a push facility is provided at the master server, and any IPCenter may serve as a head-end to push information.

There is thus provided a system for allowing users to access the Internet directly without needing an ISP servers or gateways. The system places the complexity at the user, allowing the bulk of the communication to pass in a peer to peer connection format. Thus Internet service provision can be provided without requiring a large investment in infrastructure.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

What is claimed is:

1. Internet connection management unit for facilitating end to end Internet connections between subscribers, said unit comprising:
   a database for storing user identification names of said subscribers in a first field and respective assigned user IP addresses in a second field,
   a database manager for determining assigned user if addresses of ones of said subscribers currently connected and dynamically updating said second field therewith,
   an interface for receiving external requests specifying at least one user identification request from a subscriber hub interfacing with at least one subscriber electronic device, and
   a request manager for receiving said external requests specifying at least one user identification request from said interface, interrogating said database and responding with respective IP addresses.

2. The unit of claim 1, being operable to connect to said subscribers via wireless data links.

3. The unit of claim 1, further comprising a security layer.

4. The unit of claim 3, wherein said security layer comprises a firewall.

5. The unit of claim 3, wherein said security layer comprises connection authentication functionality.

6. The unit of claim 3, wherein said security layer comprises encryption functionality.

7. The unit of claim 3, further comprising connection monitoring functionality for monitoring said subscriber end to end connection.

8. The unit of claim 7, said functionality for monitoring being associated with functionality for providing billing records.

9. The unit of claim 1, further comprising pushing functionality for sending data to a group or to all of said subscribers.

10. A system for peer to peer communication between subscribers, the system comprising:
   a) a subscriber end digital communication management device for managing communications between subscriber devices and remote subscribers, the communication management device comprising:
      an internal local area network (LAN) interface for interfacing with at least one subscriber electronic device over a LAN,
      an IP address manager for formulating a request for an IP address corresponding to a user defined remote subscriber, submitting said request and recording a response thereto, and
      a packet addresser, associated with said IP address manager, for addressing data packets to said user defined remote subscriber using an IP address taken from said recorded response, and
   b) an Internet connection management device for receiving and processing said request, said connection management device comprising:
      a database for storing user identification names of said subscribers in a first field and respective assigned user IP addresses in a second field,
      a database manager for determining assigned user IP addresses of ones of said subscribers currently connected and dynamically updating said second field therewith, and
      a request manager for receiving external requests specifying at least one user identification request, interrogating said database and responding with respective IP addresses,
   thereby to provide peer to peer connections between said subscribers.

11. The system of claim 10, further comprising c) a billing mechanism for accumulating a transaction log at the subscriber end and retrieving data of said log to the Internet connection management device.

* * * * *